United States Patent [19]

Williams

[11] Patent Number: 5,112,015

[45] Date of Patent: May 12, 1992

[54] AIR CONDITIONER BRACKET ASSEMBLY

[76] Inventor: Chris Williams, 36 Brahms Avenue, Willowdale, Ontario, Canada, M2H 1H4

[21] Appl. No.: 495,175

[22] Filed: Mar. 19, 1990

[51] Int. Cl.⁵ ............................................. F16M 11/00
[52] U.S. Cl. .................................... 248/236; 248/231.4
[58] Field of Search .................... 248/236, 208, 231.4, 248/316.4, 228; 182/53-60; 108/46; 211/90; 24/514, 569

[56] References Cited

U.S. PATENT DOCUMENTS

| | | | |
|---|---|---|---|
| 1,371,516 | 3/1921 | Offerman | 182/60 X |
| 1,711,354 | 4/1929 | King | 182/60 |
| 1,921,401 | 8/1933 | Weiler | 248/208 X |
| 2,148,239 | 2/1939 | Kumutat | 182/58 |
| 2,195,299 | 3/1940 | Frankel | 248/208 |
| 2,535,563 | 12/1950 | Boyer et al. | 248/231.4 X |
| 2,631,346 | 3/1953 | Wengen et al. | 248/316.4 X |
| 2,717,139 | 9/1955 | Jewell | 248/208 X |
| 2,814,534 | 11/1957 | Otani | 182/60 |
| 3,396,851 | 8/1968 | Buckner et al. | 248/228 |

*Primary Examiner*—Alvin C. Chin-Shue
*Attorney, Agent, or Firm*—Arne I. Fors; D. Doak Horne

[57] ABSTRACT

An apparatus for mounting an air conditioner unit on a sill of a window opening in a wall wherein the apparatus comprises a substantially horizontal platform adapted for resting on a sill and receiving an air conditioner unit. The platform comprises a first and second jaw extending below the platform from opposite ends thereof and adapted for opposed relative movement at ends of the jaws remote from the platform for contact with said wall. The apparatus further comprises a biasing means for releasably securing the jaws in contact with the wall whereby the apparatus, sill and wall form a non-yielding structure.

10 Claims, 3 Drawing Sheets

AIR CONDITIONER BRACKET ASSEMBLY

BACKGROUND OF THE INVENTION

This invention relates to an apparatus for mounting and supporting an air conditioning unit on a window ledge.

Air conditioning units have become increasingly popular particularly those designed to be mounted in a window opening of dwellings which are relatively small or where localized cooling may be satisfactory.

Air conditioning units of this type are relatively compact but may weigh a considerable amount. The installation of such units generally require a high degree of strength and agility in order to manipulate the unit onto the window ledge and securing it therein.

It is common practice to install such an air conditioning unit in a window opening by resting the air conditioning unit on the window ledge or sill. For a double hung window the lower window is closed until it contacts the air conditioning unit and thus preventing the air conditioning unit from overturning from the window. Until the window is firmly closed against the air conditioning unit or some other means of preventing the unit from overturning, there is a possibility of the air conditioning unit falling from the window ledge. In order to prevent such occurrence, the air conditioning unit is sometimes installed from the exterior of the dwelling using ladders to obtain access to the window ledge usually requiring two persons.

In order the alleviate such a problem, platforms have been used to support the air conditioning unit on the window sill to prevent overturning. An example of such a platform, is disclosed in U.S. Pat. No. 2,717,139. Such platforms typically are clamped to the window sill and extend outwardly from the window opening and are supported by a fixed 45° brace between the remote end of the platform and the wall. The air conditoning unit can then be placed on the platform safely greatly reducing the risk of overturning. Such platforms are unsatisfactory as they require a certain degree of skill in assembling the various parts. Further, these platforms may require installation from the exterior of the building making such units unsuitable for installation in high rise apartment buildings where exterior access is impossible.

SUMMARY OF THE INVENTION

These disadvantages may be overcome by providing an apparatus which may be easily installed and removed yet provide a suitable non-yielding platform for safely supporting the air conditioning unit in a window opening, both during installation and during use.

It is a further object of this invention that such apparatus be easy to install and remove with a minimum of operations yet provide a non-yielding structure for the air conditioning unit.

BRIEF DESCRIPTION OF THE DRAWINGS

In drawings which illustrate embodiments of the invention:

FIG. 4 is an exploded bottom view of the embodiment of FIG. 1.

DETAILED DESCRIPTION OF THE PREFERRED EMBODIMENT

Figure 1:
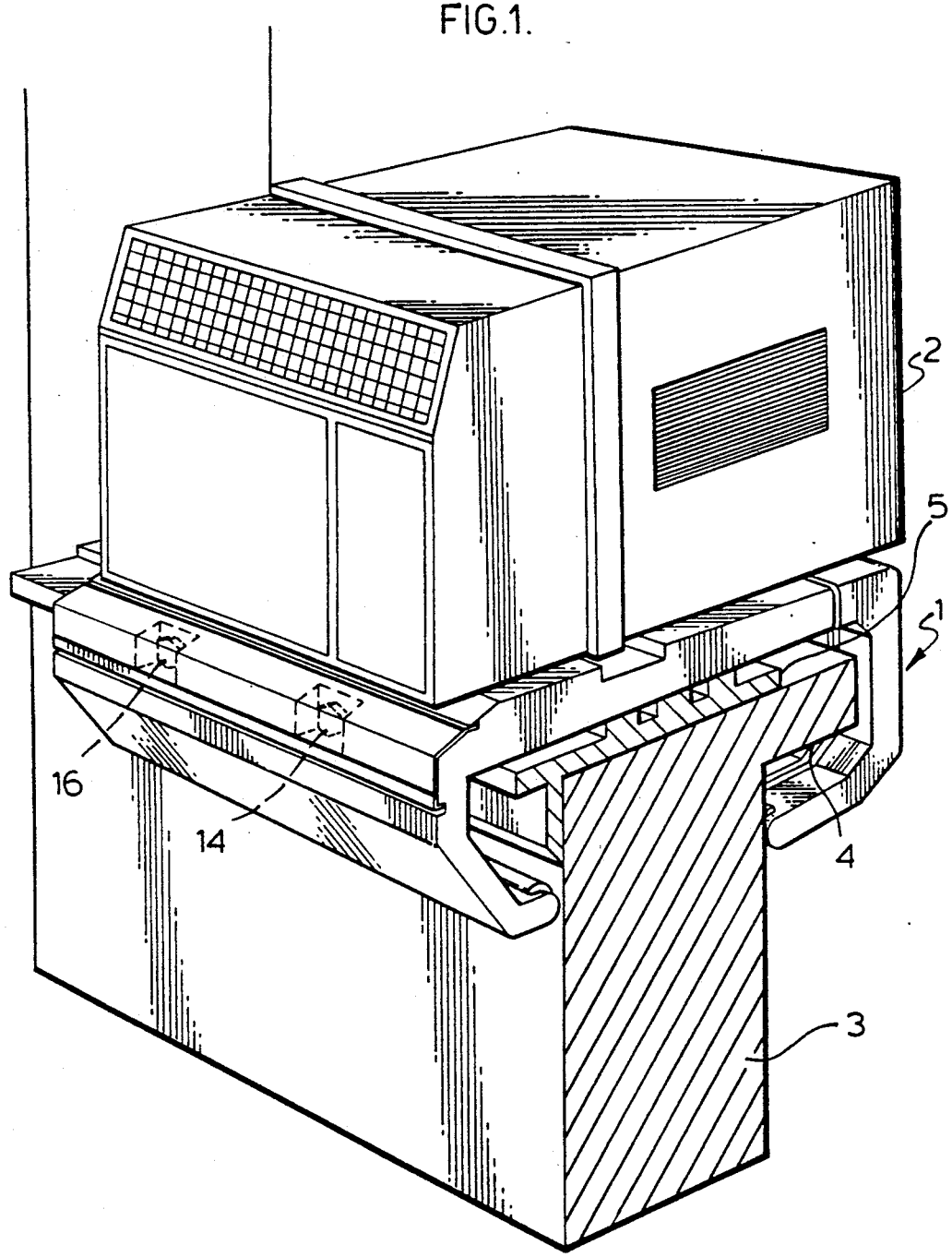
FIG. 1 is a perspective view of the preferred embodiment as applied to a window case and supporting an air conditioning unit.
Figure 2:
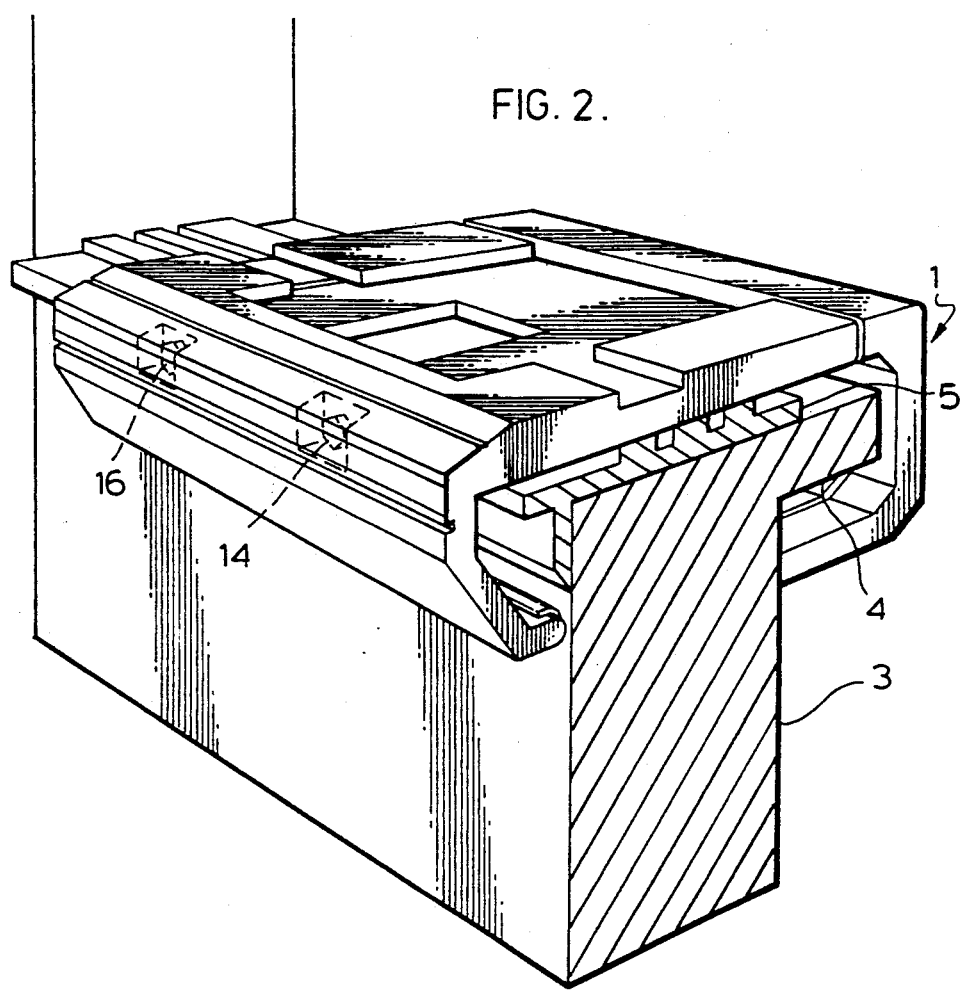
FIG. 2 is a perspective view of the embodiment of FIG. 1.

With reference to FIGS. 1 and 2, the air conditioner support apparatus is shown generally as 1 supporting an air conditioning unit 2. Support apparatus 1 rests upon window sill 5 of a window opening of wall 3.

Figure 3:
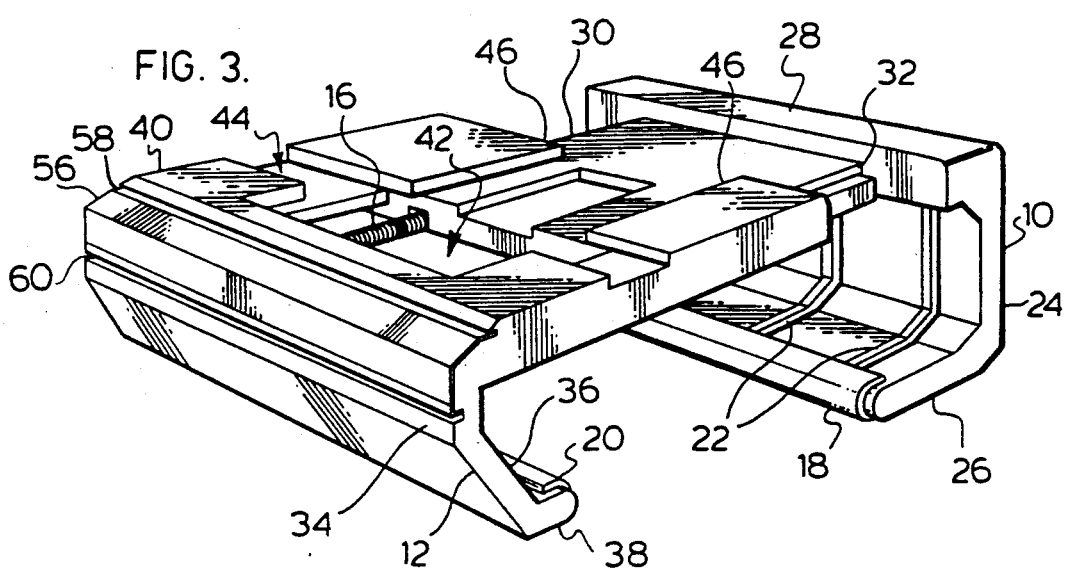
FIG. 3 is a perspective view of the embodiment of FIG. 1.
Figure 1:
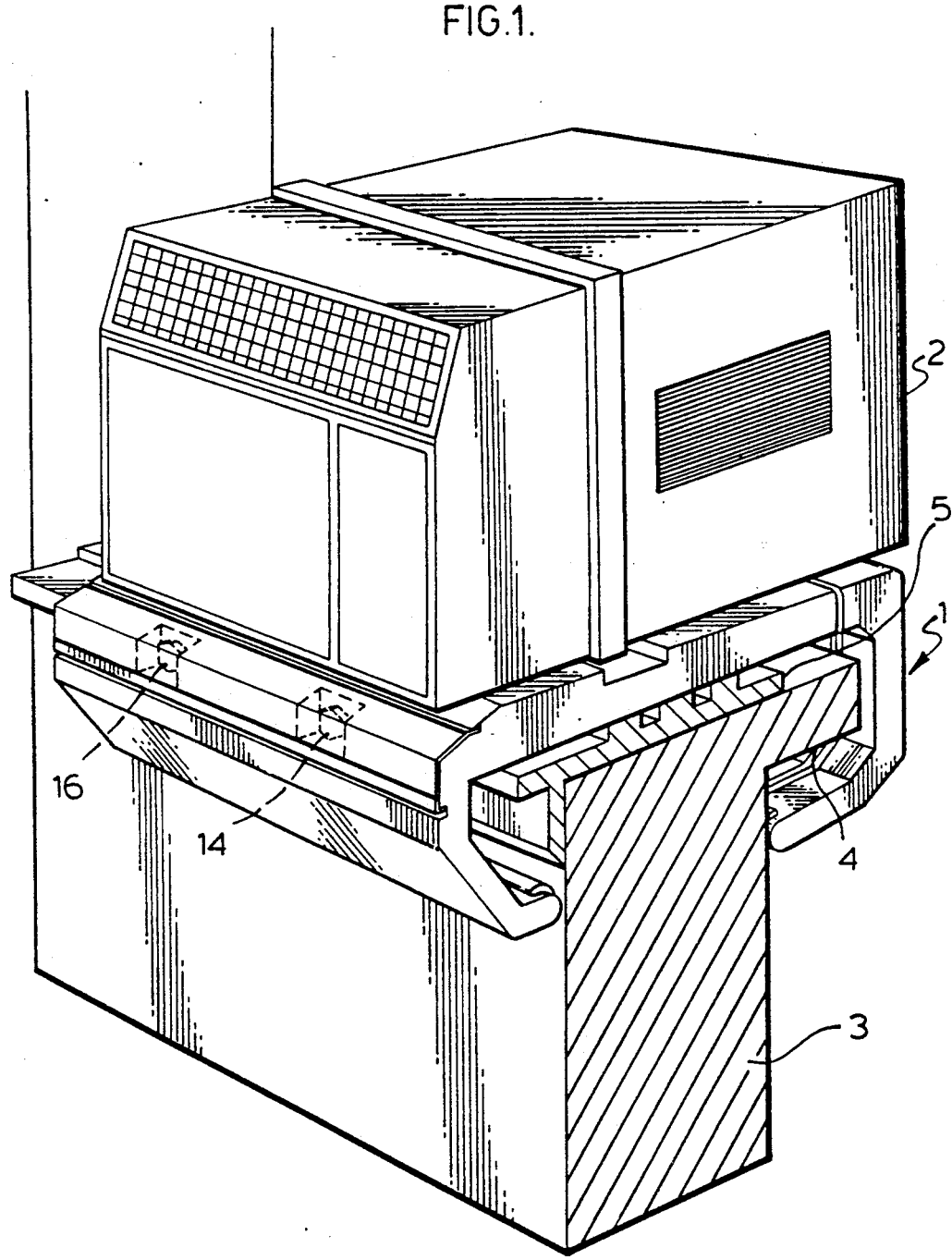

With reference to FIGS. 3 and 4, support apparatus 1 generally comprises exterior jaw 10 and interior jaw 12. Jaws 10 and 12 in the preferred embodiment, have a substantially "C" shape in cross-section and substantially the same width.

Exterior jaw 10 comprises a vertical wall portion 24 integral with a lower portion 26 substantially perpendicular to vertical wall portion 24 and an upper portion 28 substantially perpendicular to vertical wall 24. Exterior jaw 10 is further provided with a rectangular plate 30 extending substantially perpendicular with vertical wall 24 and in the same direction as lower portion 26. Plate 30 has a pair of ledges 32 extending along the length of the upper edge of both sides of plate 30.

Interior jaw 12 has a vertical wall portion 34 communicating with an angled wall portion 36 and a lower portion 38 extending substantially perpendicular to vertical wall portion 34 in a direction opposite lower portion 26 of exterior jaw 10 and upper plate 40. Upper plate 40 extends substantially perpendicular from vertical wall portion 34 in the same direction as lower portion 38 and having a width substantially equal to that of wall portion 34.

Plate 40 is provided with a rectangular well 42 extending from the end of plate 40 remote from vertical wall portion 34 and extending the length of and substantially parallel with the side edges of plate 40. Plate 40 is further provided with a second rectangular well 44 which extends from side to side of plate 40 but having a depth less than that of well 42. Upper surface of plate 40 is further provided with a rectangular lip 46 which extends substantially coplanar with the upper surface of plate 40 and extends over well 42 at the side edges thereof.

The cross-sectional configuration of plate 30 is complimentary with the cross-sectional configuration of well 42 such that plate 30 is adapted to matingly engage well 42 in a sliding fit.

Interior jaw 12 is provided with a pair of bores spaced inwardly of the side edges of plate 40, having an axis substantially parallel thereto and extending through said vertical wall 34 into the well 42. The bores are adapted to receive bolts 14 and 16.

Plate 30 of exterior jaw 10 is provided with a pair of channels 48 and 50 extending substantially perpendicular to vertical wall portion 24 and located on the underside of plate 30 and spaced inwardly from the sides of plate 30. Channels are spaced inwardly to align with the bores of interior jaw 12.

In order to increase the rigidity of jaws 10 and 12, each is provided with reinforcement ribs 22 on the inside wall of jaws 10 and 12.

A nut is firmly affixed using known methods such as ultrasonic bonding within channels 48 and 50 at the end remote from wall portion 24. Bolts 14 and 16 extend through bores of jaw 12 for engagement with nuts 52 and 54, respectively. In the preferred embodiment bolts 14 and 16 are of the hex-key type, requiring a hex-key for operation.

The remote ends of jaws 10 and 12 are provided with non-marking coverings 18 and 20 along the entire width thereof to prevent slippage between the remote ends and wall 3 and to prevent scuffing of wall 3.

Well 44 is spaced inwardly from vertical wall 34 a distance substantially equal to the distance lower portion 38 extends from vertical wall 34.

The distance from well 44 to the end of plate 40 preferably should exceed the distance from well 44 to vertical wall 34 up to the order of 2:1. In the preferred embodiment well 44 is aligned with sill 5 permitting the air seals of the air conditioning unit to extend outwardly and sealingly engage the sides of the window opening.

The length of plate 30 is substantially equal to the length of well 42 so that when plate 30 is fully registered within well 42, the end of plate 40 abuts with the end of upper portion 28 of exterior jaw 10.

The height of vertical wall portion 24 preferably should be of the same length as the length of lower portion 26 of exterior jaw 10.

In the preferred embodiment, when plate 30 is fully registered within well 42, the distance between remote ends of jaws 10 and 12 does not exceed the thickness of a standard exterior wall or approximately four inches.

In operation, plate 30 is inserted into well 42 until it is fully registered within well 42 and the end of plate 40 abuts with the end of upper portion 28 of jaw 10. Bolts 14 and 16 are inserted through bores in vertical wall 34 until it enters channels 48 and 50 and engages nuts 52 and 54. Bolts 14 and 16 are rotated in one sense advancing nuts 52 and 54 along the length of bolts 14 and 16. As bolts 14 and 16 abut against face vertical wall 34, exterior jaw 10 is urged towards jaw 12.

Bolts 14 and 16 are rotated using a hex-key (not shown).

For installation of the apparatus onto a window sill of a window opening, bolts 14 and 16 are rotated in an opposite sense urging the jaws 10 and 12 apart until the distal ends of jaws 10 and 12 are separated by a distance exceeding the width of the window frame 4. The apparatus is placed over the window frame 4 until plate 40 rests upon the window sill 5. Bolts 14 and 16 are rotated advancing nuts 52 and 54 along the length of bolts 14 and 16 urging jaws 10 and 12 together. The distal ends of jaws 10 and 12 contact wall 3 at a distance below window frame 4. Bolts 14 and 16 are further advanced until the apparatus firmly grips wall 3 forming a nonyielding structure.

Plate 30 may be provided with a recess on the upper surface thereof for storing the hex-key (not shown) after the apparatus has been securely installed.

Once installed, plate 40, upper portion 18 and plate 30 form a non-yielding platform for receiving the air conditioner unit.

The air conditioner unit 2 is then placed on the platform with the air seal on the underside of the air conditioning unit being placed within well 44, enabling air conditioner 2 to rest upon a coplanar surface.

The heads of bolts 14 and 16 may be hidden from view by use of a cover plate 56 extending from side to side of interior jaw 12 by being inserted into groove 58 and 60.

The relatively simple geometric shape of the preferred embodiment makes such apparatus suitable for manufacture by an injection moulding method using a suitable polyvinyl plastic material.

While various changes may be made in the detail or construction, it shall be understood that such changes shall be within the spirit and scope of the present invention.

I claim:

1. An apparatus for mounting an air conditioner unit on a sill of a window opening in a wall wherein said apparatus comprises a substantially horizontal platform adapted for resting on said sill and receiving said air conditioner unit and having a recess adapted for receiving an airseal on the underside of said air conditioner unit, said platform comprising a first jaw rigidly engaging a first portion of said platform and a second jaw rigidly engaging a second portion of said platform, said first portion slidingly engaging said second portion, said jaws extending the width of said platform and below said platform from opposite ends thereof, said jaws comprising a straight vertically extending portion and an integral horizontally extending portion having ends thereof adapted for frictional engagement with said wall remote from said platform and below said sill, said first portion integral with said first jaw and said second portion integral with said second jaw and biasing means for releasably gripping said jaws onto said wall, said biasing means adapted for expanding said jaws over said sill, for urging said jaws together clamping said apparatus onto said wall and for expanding said jaws releasing said apparatus from said wall, whereby said apparatus, sill and wall form a nonyielding structure when said apparatus is clamped on said wall and said ends of said horizontal portion of said jaws frictionally engage said wall supporting opposite ends of said platform.

2. An apparatus as claimed in claim 1 wherein said biasing means is a screw means.

3. An apparatus as claimed in claim 2 wherein said screw means comprises a screw extending through said first portion of said platform and threadingly engages with a nut mounted within said second portion of said platform.

4. An apparatus as claimed in claim 3 wherein said second portion of said platform is provided with a channel for receiving said bolt and said nut is mounted within said channel.

5. An apparatus as claimed in claim 4 wherein said vertically extending portion having a height and said horizontally extending portion having a length substantially equal thereto.

6. An apparatus as claimed in claim 5 wherein said first and second jaw is injection moulded with a polyvinyl plastic material and said nut is affixed to said apparatus by ultrasonic bonding.

7. An appartaus as claimed in claim 6 wherein said apparatus includes a plurality of biasing means.

8. An apparatus as claimed in claim 7 wherein said plurality of biasing means are ganged together.

9. An apparatus for mounting an air conditioner unit on a sill of a window opening in a wall wherein said apparatus comprises a substantially horizontal platform adapted for resting on said sill and receiving said air conditioner unit and having a recess adapted for receiving an airseal on the underside of said air conditioner unit, said platform comprising a first jaw integral with a first portion of said platform and a second jaw integral with a second portion of said platform, said first portion in slidingly engagement said second portion, said jaws extending the width of said platform and below said platform from opposite ends thereof, said jaws comprising a straight vertically extending portion having a length substantially equal to an integral horizontally extending portion having ends thereof adapted for frictional engagement with said wall remote from said platform and below said sill, said platform being injection moulded with a polyvinyl plastic material, and a plurality of biasing means ganged together for releasably gripping said jaws onto said wall, said biasing means adapted for expanding said jaws over said sill, for urging said jaws together clamping said apparatus onto said wall with said ends of said horizontal portion of said jaws frictionally engaging said wall supporting opposite ends of said platform thereby forming a non-yielding structure and for expanding said jaws releasing said apparatus from said wall, said biasing means comprising a screw extending through said first portion of said platform and threadingly engages a nut ultrasonically bonded within a channel adapted for receiving said screw.

10. An apparatus as claimed in claim 9 wherein said recess is adapted to substantially aligned with said window sill when said apparatus is clamped onto said wall.

* * * * *